US008479213B2

(12) United States Patent
Jones et al.

(10) Patent No.: US 8,479,213 B2
(45) Date of Patent: Jul. 2, 2013

(54) LOAD BALANCING MEDICAL IMAGING APPLICATIONS ACROSS HEALTHCARE IMAGING DEVICES IN REFERENCE TO PROJECTED LOAD BASED ON USER TYPE

(75) Inventors: Cheryl Ruth Jones, Hubertus, WI (US); Rakesh Mohan Lal, Waukesha, WI (US); Toan T Le, Germantown, WI (US); Matthew Richard Schwartz, Oconomowoc, WI (US); Helen Hong Peng, Brookfield, WI (US); Guy Bernard, Fontenay Aux Roses (FR); David Charles Mack, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 1447 days.

(21) Appl. No.: 11/627,241

(22) Filed: Jan. 25, 2007

(65) Prior Publication Data
US 2008/0184254 A1 Jul. 31, 2008

(51) Int. Cl.
*G06F 9/46* (2006.01)

(52) U.S. Cl.
USPC .......................................................... 718/105

(58) Field of Classification Search
USPC .......................................................... 718/105
See application file for complete search history.

(56) References Cited

U.S. PATENT DOCUMENTS

| 5,349,662 | A  | * | 9/1994  | Johnson et al. | 717/127 |
|-----------|----|---|---------|----------------|---------|
| 7,290,259 | B2 | * | 10/2007 | Tanaka et al.  | 718/1   |
| 8,285,826 | B2 | * | 10/2012 | Battle et al.  | 709/223 |
| 2002/0087611 | A1 | * | 7/2002 | Tanaka et al. | 709/1   |
| 2002/0087694 | A1 | * | 7/2002 | Daoud et al.  | 709/226 |
| 2004/0143664 | A1 | * | 7/2004 | Usa et al.    | 709/226 |
| 2004/0225443 | A1 | * | 11/2004 | Kamps        | 702/14  |
| 2005/0065438 | A1 | * | 3/2005 | Miller        | 600/437 |
| 2005/0213832 | A1 | * | 9/2005 | Schofield et al. | 382/240 |
| 2006/0156274 | A1 | * | 7/2006 | Andreev et al. | 717/100 |

* cited by examiner

*Primary Examiner* — Meng An
*Assistant Examiner* — Brian Chew
(74) *Attorney, Agent, or Firm* — The Small Patent Law Group; Dean D. Small (57) ABSTRACT

Systems, methods and apparatus are provided through which in some embodiments healthcare imaging processing applications are allocated to computing resources in reference to criteria.

18 Claims, 10 Drawing Sheets

LOAD BALANCING MEDICAL IMAGING APPLICATIONS ACROSS HEALTHCARE IMAGING DEVICES IN REFERENCE TO PROJECTED LOAD BASED ON USER TYPE

FIELD OF THE INVENTION

This invention relates generally to managing computing resources, and more particularly to loading balancing of healthcare imaging computer applications and resources.

BACKGROUND OF THE INVENTION

Conventional healthcare computing systems can include multiple computer and data nodes to support a large number of users. When one of the users initiates a process, such as rendering a healthcare image, the process is assigned to one of the computer nodes.

In conventional healthcare-related computing systems, determining the assignment of users and applications to computer node is a fairly primitive process that often results in serious imbalances of processing loads between the health-related computing systems. When a process is assigned to a node, the node can become overloaded with processing requirements. More specifically, one computer node in the system can have an overwhelming processing load while another computer node can have no processing load or a very light processing node. The overwhelming processing load experienced by some computer nodes can cause delays in the completion of the process which is at the very least inconvenient for the user. The delay can also increase the cost of attendant users, and in medical emergencies the delay can threaten the life of the patient.

The assignment of a process to a computer node cannot be easily switched dynamically to another computer node because the complexity of the healthcare applications presents difficulty in moving the data between computer nodes in the middle of execution. The difficulty in moving processes between computers during execution places greater importance on assigning each process to a proper computer node from the beginning.

For the reasons stated above, and for other reasons stated below which will become apparent to those skilled in the art upon reading and understanding the present specification, there is a need in the art to balance the load of users and processes across computer nodes in a healthcare environment to prevent overloading of one or several computer nodes down while other computer node(s) have a substantially lighter processing load.

BRIEF DESCRIPTION OF THE INVENTION

The above-mentioned shortcomings, disadvantages and problems are addressed herein, which will be understood by reading and studying the following specification.

In one aspect, load balancing for medical imaging applications is based upon parameters or a list of factors which provides for more even and balanced distributions of healthcare-related computing resources, which reduces the problem of applications of some users performing in an untimely manner because other users on some of the healthcare-related computing resources are using a lot of the resource, while other users on healthcare-related computing resources have a very light load.

In another aspect, a method to manage healthcare-related computing resources includes receiving load-balancing criteria and load-balancing of the healthcare-related computing resources in reference to the load-balancing criteria.

In yet another aspect, a method to manage healthcare-related computing resources includes receiving a representation of real-time usage data associated with each of dynamic client-server healthcare applications across healthcare-related computing resources and load-balancing of the healthcare-related computing resources in reference to the real-time usage data associated with each of the healthcare-related computing resources.

In yet a further aspect, a method includes selecting image data and an application for load balancing, a computing/determining a projected load of the application, checking current load on computer nodes, assigning the user/app to a computer node and starting execution of the application on that computer node.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, embodiments of methods are described. In the third section, a hardware and the operating environment in conjunction with which embodiments may be practiced are described. In the fourth section, particular implementations are described. Finally, in the fifth section, a conclusion of the detailed description is provided.

System Level Overview

Figure 1:
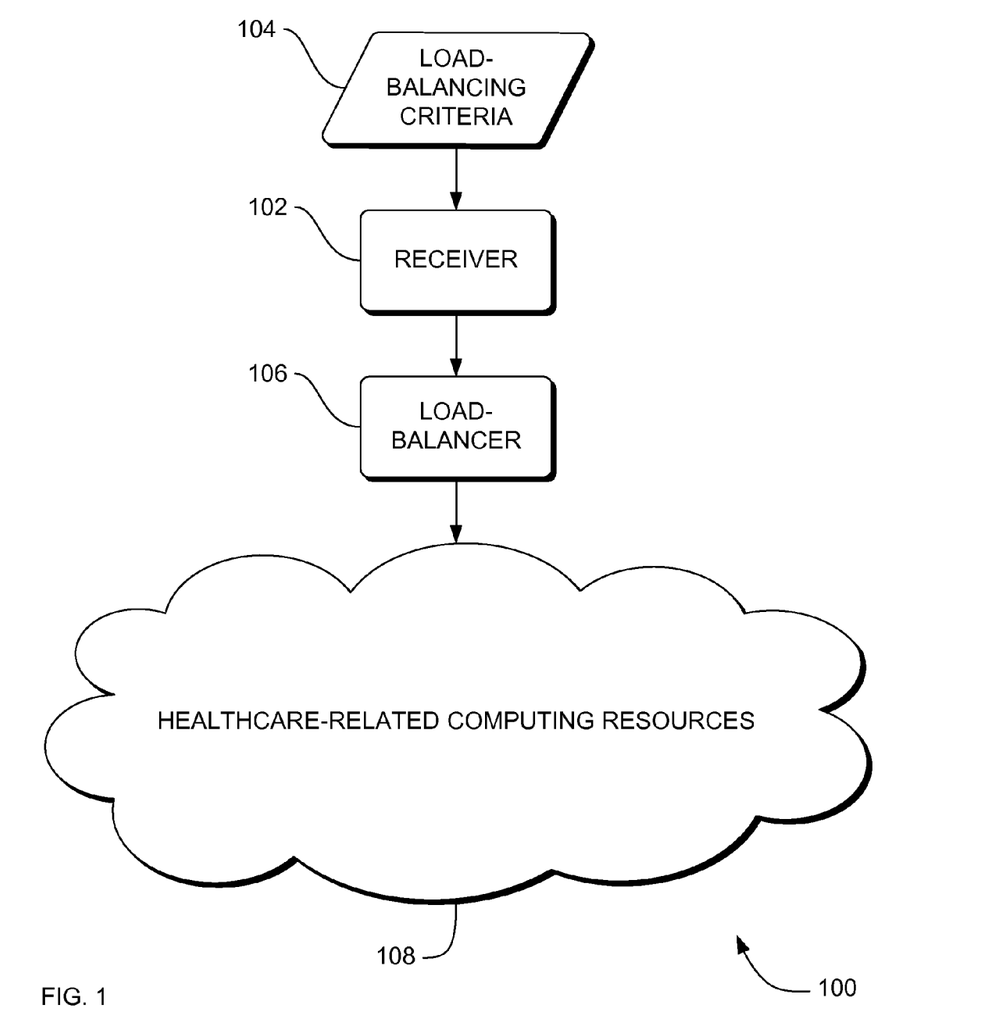
FIG. 1 is a block diagram of an overview of a system to manage healthcare-related computing resources.

FIG. 1 is a block diagram of an overview of a system 100 to manage healthcare-related computing resources. System 100 solves the need in the art to balance the load of users and processes across computer nodes in a healthcare computing environment.

System 100 includes a receiver 102 of load-balancing criteria 104.

System 100 also includes a dynamic load-balancer 106 of client-server healthcare applications across healthcare-related computing resources 108 in reference to the load-balancing criteria 104. In some embodiments, the load-balancer 106 analyzes load-balancing criteria 104 to determine the estimated load this user's session will place on healthcare-related computing resources 108, both in terms of CPU usage and memory load, and will execute the application on a portion of the healthcare-related computing resources 108 that can at the current time best handle that load. For example, users/applications with heavy projected load will be placed on healthcare-related computing resources 108 that have minimal load and users/applications with light projected load will be executed on healthcare-related computing resources 108 that have higher current load.

One example of the healthcare-related computing resources 108 is a node in a health-computing network. The node itself can be one of a separate motherboard, daughterboard, CPU core(s) and/or graphics processing unit(s) (GPUs) in a computer system, or a separate computer node (e.g. server 702 in FIG. 7) in a cluster of computers such as a server farm. In some embodiments, a node is a medical imaging workstation, such as an Advantage™ workstation manufactured by General Electric of Schenectady, N.Y.

A more balanced distribution of users running applications on healthcare-related computing resources 108 provides better overall performance for users.

While the system 100 is not limited to any particular receiver 102, load-balancing criteria 104, load-balancer 106, healthcare-related computing resources 108 and balancing criteria 110 for sake of clarity a simplified receiver 102, load-balancing criteria 104, load-balancer 106, healthcare-related computing resources 108 and balancing criteria 110 are described. The application area of the healthcare-related computing resources can be medical computing resource, such as medical imaging computing resources and/or psychiatric computing resources.

The system level overview of the operation of an embodiment is described above in this section of the detailed description. Some embodiments operate in a multi-processing, multi-threaded operating environment on a computer, such as server 702 in FIG. 7.

Method Embodiments

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Methods 200-600 are performed by a program executing on, or performed by firmware or hardware that is a part of, a computer, such as server 702 in FIG. 7.

Figure 2:
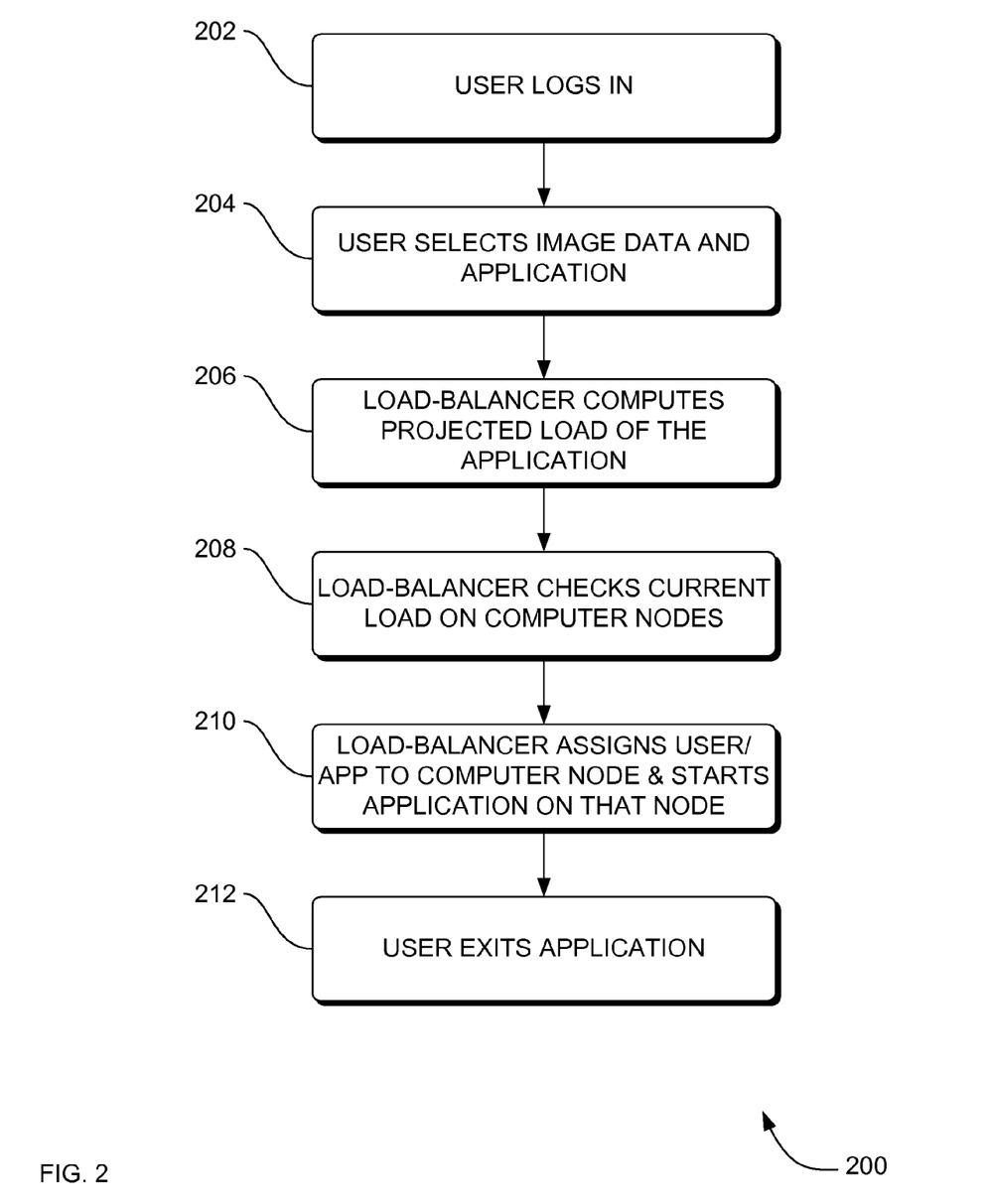
FIG. 2 is a flowchart of a method to manage healthcare-related computing resources, according to an embodiment.

FIG. 2 is a flowchart of a method 200 to manage healthcare-related computing resources, according to an embodiment. Method 200 solves the need in the art to balance the load of users and processes across computer nodes in a healthcare computing environment.

In method 200, a user logs in 202 and thereafter the user selects 204 image data and application for load balancing. The load-balancer 106 computes/determines 206 a projected load of the application. The load-balancer 106 also checks 208 current (estimated/actual) load on computer nodes (e.g. healthcare-related computing resources 108, and the load-balancer 106 ensures that each node is working). Thereafter the load-balancer 106 assigns 210 the user/app to a computer node and starts execution of the application on that computer node. Subsequently the user exits 210 the method 200.

Figure 3:
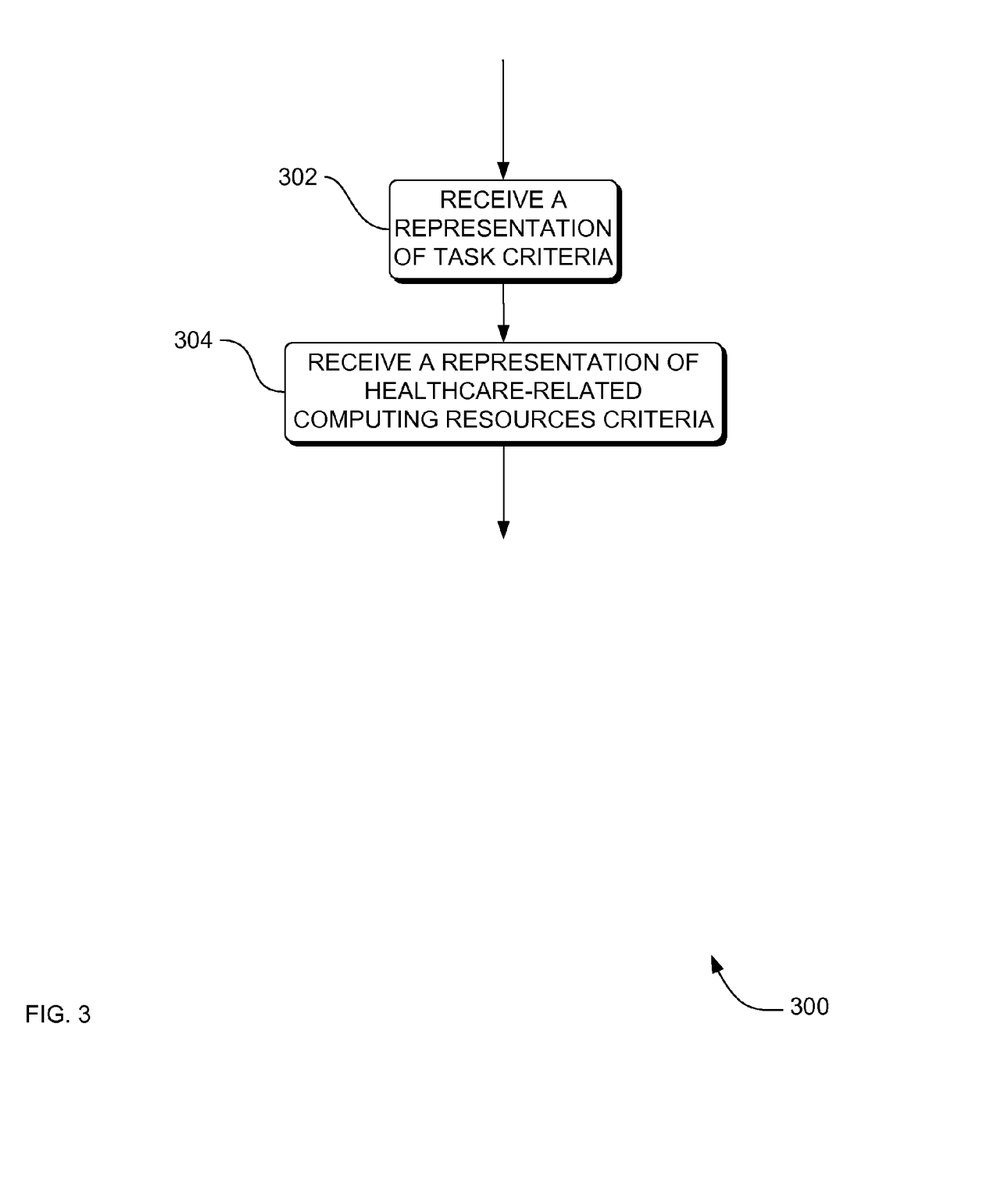
FIG. 3 is a flowchart of a method of receiving load-balancing criteria, according to an embodiment.

FIG. 3 is a flowchart of a method 300 of receiving load-balancing criteria, according to an embodiment. Method 300 is one embodiment of operations performed by the receiver 102 in FIG. 1 above. Method 300 solves the need in the art to balance the load of users and processes across computer nodes in a healthcare computing environment.

Method 300 includes receiving 302 a representation of application criteria. The application criteria (not shown) is one example or embodiment of the load-balancing criteria 104 in FIG. 1. The application criteria describes or represents attributes of an application that require healthcare-related computing resources to process the application.

An application is one thread or a process of an algorithm on data. Specific examples of an application include contouring of anatomical regions from a medical image, creating a plurality of graphical objects of related anatomical regions, and approving a healthcare purchase requisition having a plurality of itemized goods and service.

Method 300 includes receiving 304 a representation of healthcare-related computing resources criteria. Healthcare-related computing resources criteria (not shown) is one example or embodiment of the load-balancing criteria 104 in FIG. 1. Healthcare-related computing resources criteria describes or represents attributes and capabilities of a healthcare-related computing resource that is operable to process an application. The healthcare-related computing resources criteria is described in greater detail in FIG. 10 below.

The actions 302 and 304 above can be performed in the sequence shown in FIG. 3. In other embodiments, action 304 is performed before 302. In other embodiments, action 304 is performed simultaneously with 302.

Figure 4:
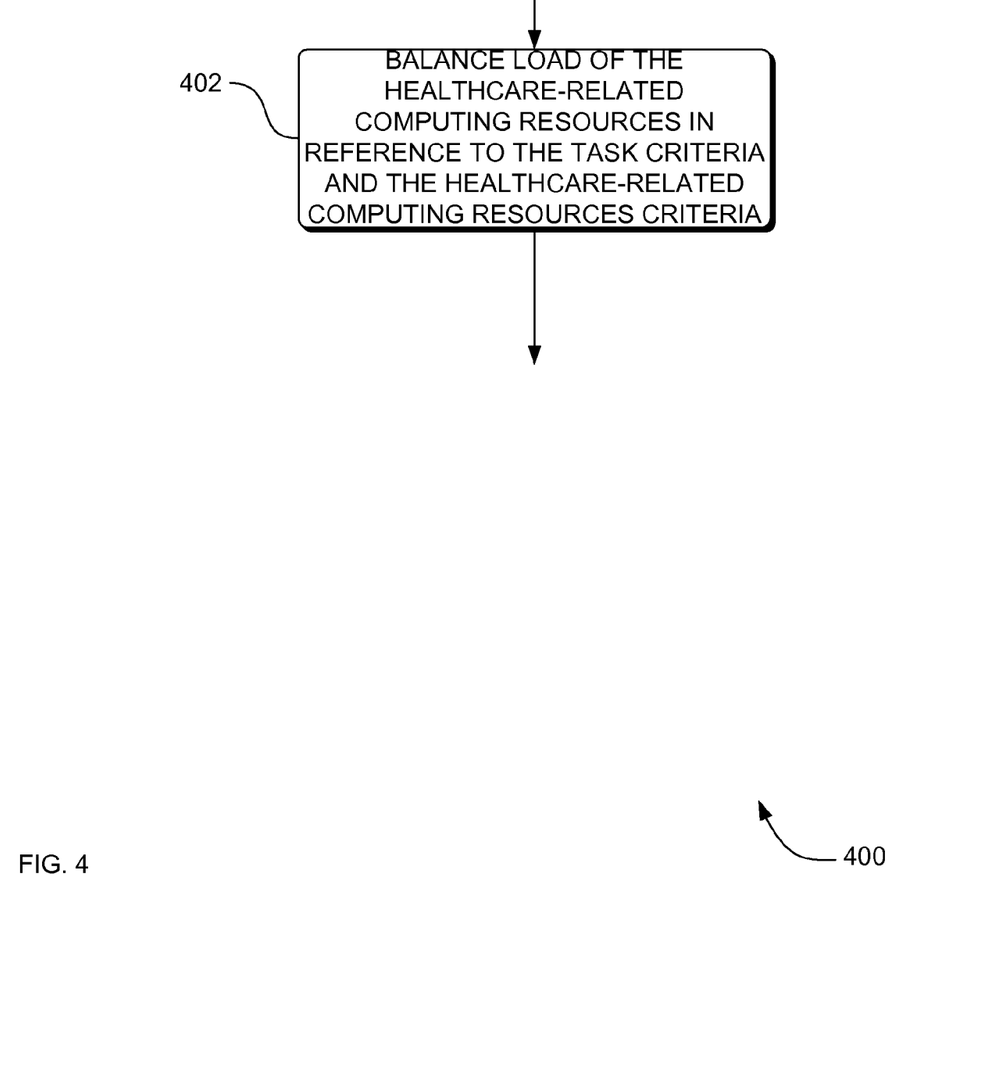
FIG. 4 is a flowchart of a method of load-balancing, according to an embodiment.

FIG. 4 is a flowchart of a method 400 of load-balancing, according to an embodiment. Method 400 is one embodiment of operations performed by the load-balancer 106 in FIG. 1. Method 400 solves the need in the art to balance the load of users and processes across computer nodes in a healthcare computing environment.

Method 400 includes load-balancing 400 of the healthcare-related computing resources 108 in reference to the application criteria that is described in FIG. 3 above and in reference to the healthcare-related computing resources criteria that is described in FIG. 3 above.

Figure 5:
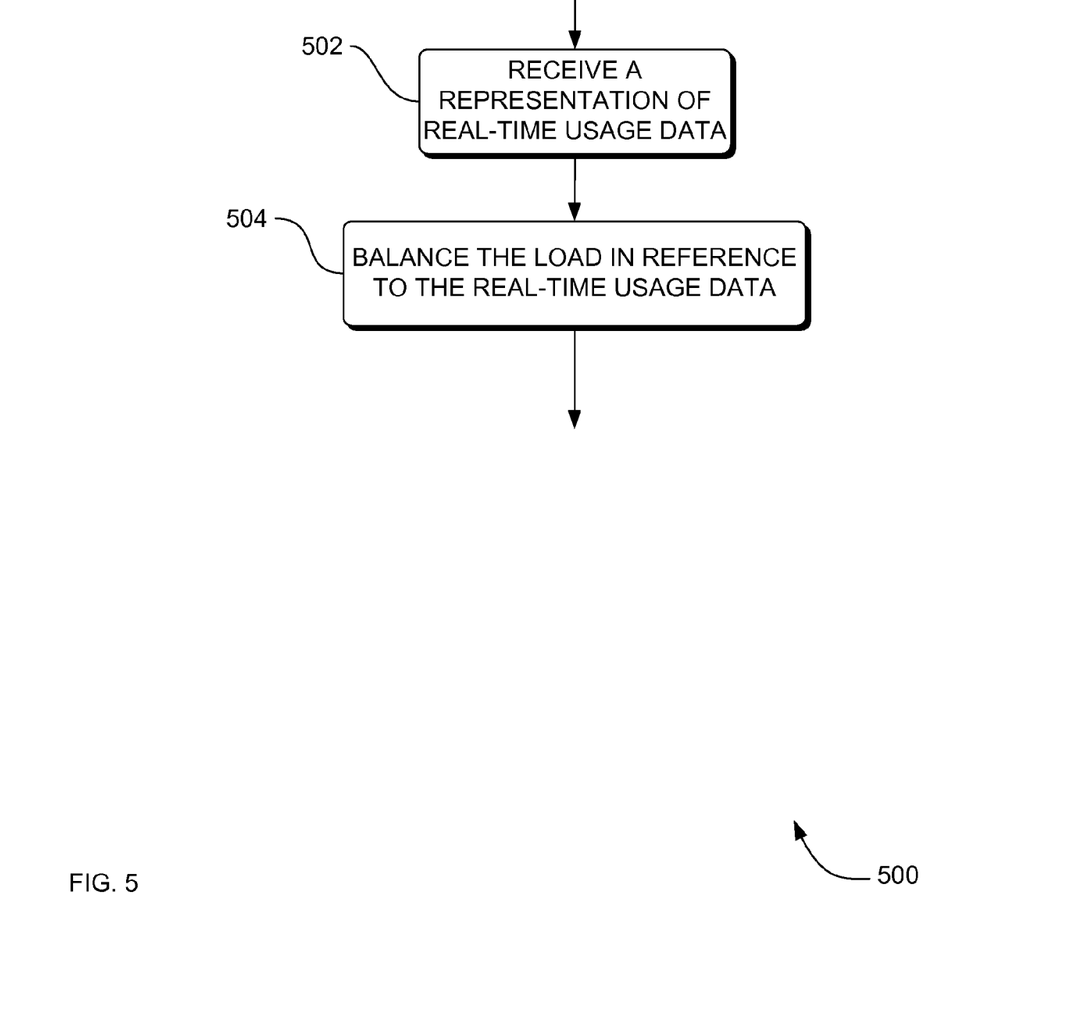
FIG. 5 is a flowchart of a method to manage healthcare-related computing resources, according to an embodiment.

FIG. 5 is a flowchart of a method 500 to manage healthcare-related computing resources, according to an embodiment. Method 500 solves the need in the art to balance the load of users and processes across computer nodes in a healthcare computing environment.

Method 500 includes receiving 502 a representation of dynamic client-server healthcare applications across associated with each of the healthcare-related computing resources 108. The receiving 502 is substantially similar to the receiving 302 a representation of application criteria in FIG. 3, with the difference being that the application criteria is a user-type.

Method 500 includes load-balancing 504 of the healthcare-related computing resources in reference to the real-time usage data associated with each of the healthcare-related computing resources.

Figure 6:
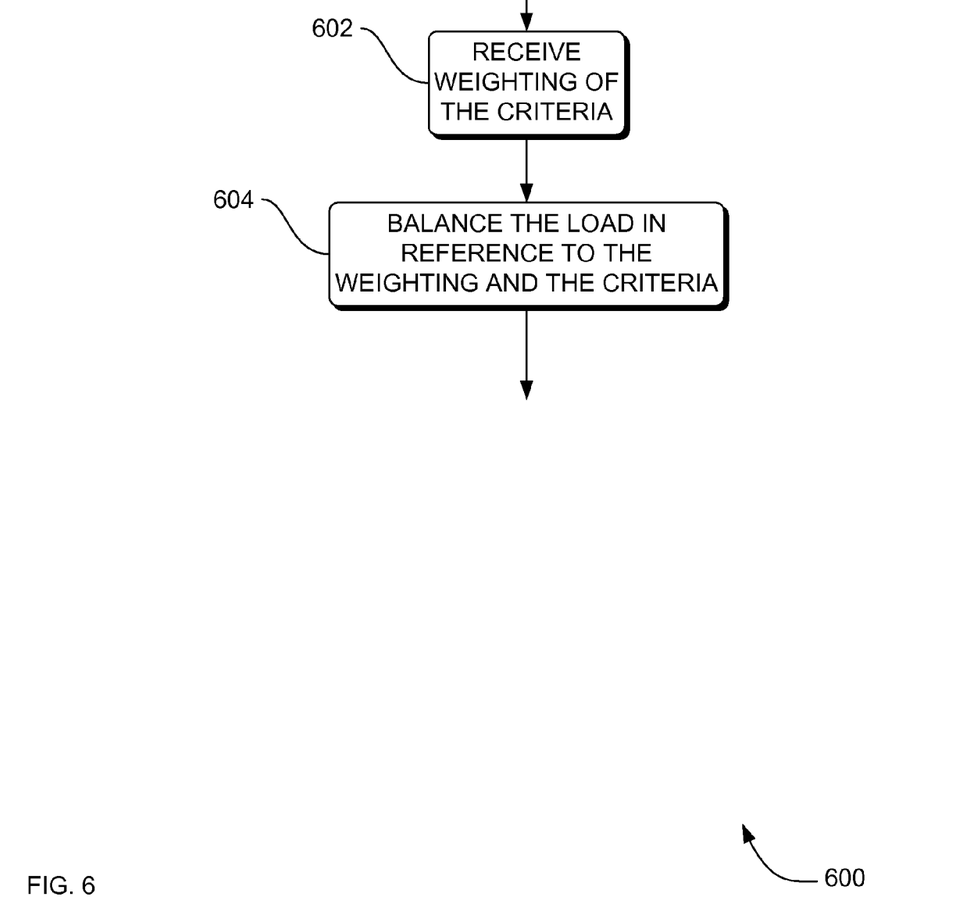
FIG. 6 is a flowchart of a method of managing healthcare-related computing resources, according to an embodiment.

FIG. 6 is a flowchart of a method 600 of managing healthcare-related computing resources, according to an embodiment. Method 600 solves the need in the art to balance the load of users and processes across computer nodes in a healthcare computing environment.

Method 600 includes receiving 602 a weighting (not shown) of each of the load-balancing criteria 104. In some embodiments, the weighting is specified, determined or identified by a human user. The weighting describes the relative significance of items of the balancing criteria. For example, in one embodiment, the weighting is an ordered list. In another embodiment, the weighting is a numerical coefficient assigned to elements of a frequency distribution in order to represent their relative importance, in which a sum of all of the numerical coefficients is 1.00 or 100.

Method 600 includes load-balancing 604 of the healthcare-related computing resources 108 in reference to the load-balancing criteria 104 and the weighting.

Figure 7:
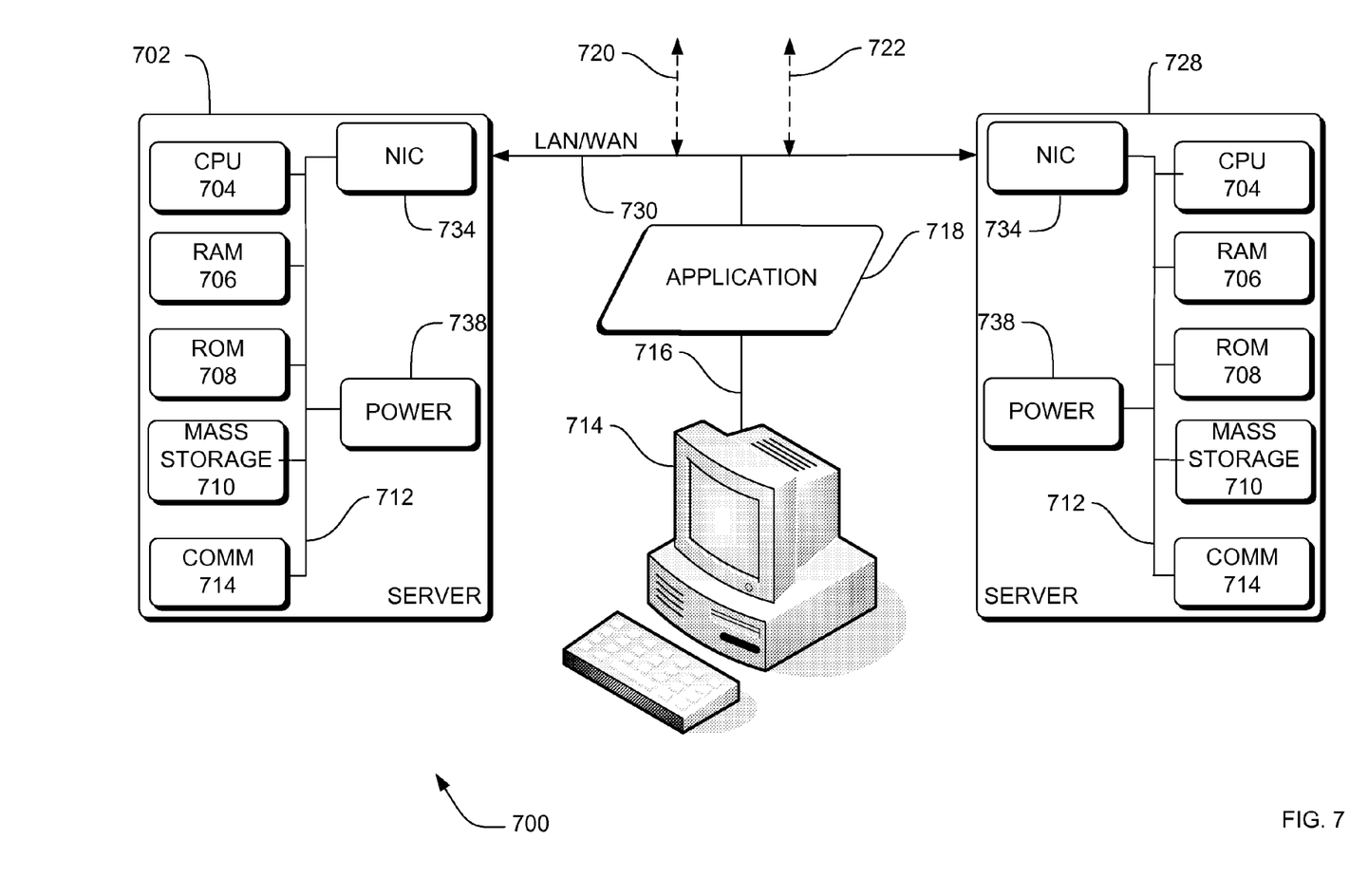
FIG. 7 is a block diagram of a hardware and operating environment in which different embodiments can be practiced.

In some embodiments, methods 200-600 are implemented as a computer data signal embodied in a carrier wave, that represents a sequence of instructions which, when executed by a processor, such as processor 704 in FIG. 7, cause the processor to perform the respective method. In other embodiments, methods 200-600 are implemented as a computer-accessible medium having executable instructions capable of directing a processor, such as processor 704 in FIG. 7, to perform the respective method. In varying embodiments, the medium is a magnetic medium, an electronic medium, or an optical medium.

Hardware and Operating Environment

FIG. 7 is a block diagram of a hardware and operating environment 700 in which different embodiments can be practiced. The description of FIG. 7 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform applications are linked through a communications network. Program modules can be located in both local and remote memory storage devices in a distributed computing environment.

Server 702 includes at least one processor 704, commercially available from Intel, Motorola and others. Server 702 also includes random-access memory (RAM) 706, read-only memory (ROM) 708, and one or more mass storage devices 710, and a system bus 712, that operatively couples various system components to the processing unit 704. The memory 706, 708, and mass storage devices, 710, are types of computer-accessible media. Mass storage devices 710 are more specifically types of nonvolatile computer-accessible media and can include one or more hard disk drives, floppy disk drives, optical disk drives, and tape cartridge drives. The processor 704 executes computer programs stored on the computer-accessible media.

Server 702 also includes an operating system (not shown) that is stored on the computer-accessible media RAM 706 and mass storage device 710, and is executed by the processor 704. Examples of operating systems include Microsoft Windows®, Apple MacOS®, Linux®, UNIX®. Examples are not limited to any particular operating system, however, and the construction and use of such operating systems are well known within the art.

Embodiments of server 702 are not limited to any particular type of server 702. In varying embodiments, server 702 comprises a PC-compatible computer, a MacOS®-compatible computer, a Linux®-compatible computer, or a UNIX®-compatible computer. The construction and operation of such computers are well known within the art. Server 702 also includes power source 738.

The server 702 can operate in a networked environment using logical connections to one or more remote computers, such as server 728. These logical connections are achieved by a communication device coupled to, or a part of, the server 702. Embodiments are not limited to a particular type of communications device. The logical connections depicted in FIG. 7 include a local-area network (LAN) and/or a wide-area network (WAN) 730. Such networking environments are commonplace in offices, enterprise-wide computer networks, intranets, extranets and the Internet.

When used in a LAN-networking environment, the servers 702 and 728 are connected to the LAN/WAN 730 through network interfaces or adapters 734, which is one type of communications device 714. Server 728 also includes a network device 734. When used in a conventional WAN-networking environment, the servers 702 and 728.

The hardware and operating environment 700 also includes a client 714 that is operably coupled to the LAN/WAN 730 through a communications path 716. The client 714 includes at least one application 718 that is load balanced across multiple servers (e.g. servers 702 and 728). One of the servers is assigned to run the application 718 on behalf of the client 714.

The hardware and operating environment 700 is not limited to the two servers 702 and 728 shown in FIG. 7. Other embodiments include more than two servers, such as in server farms. In some embodiments of the server farms, additional servers (not shown) are operably coupled to the servers 702 and 728 through the LAN/WAN via communication paths 720 and/or 722.

Figure 8:
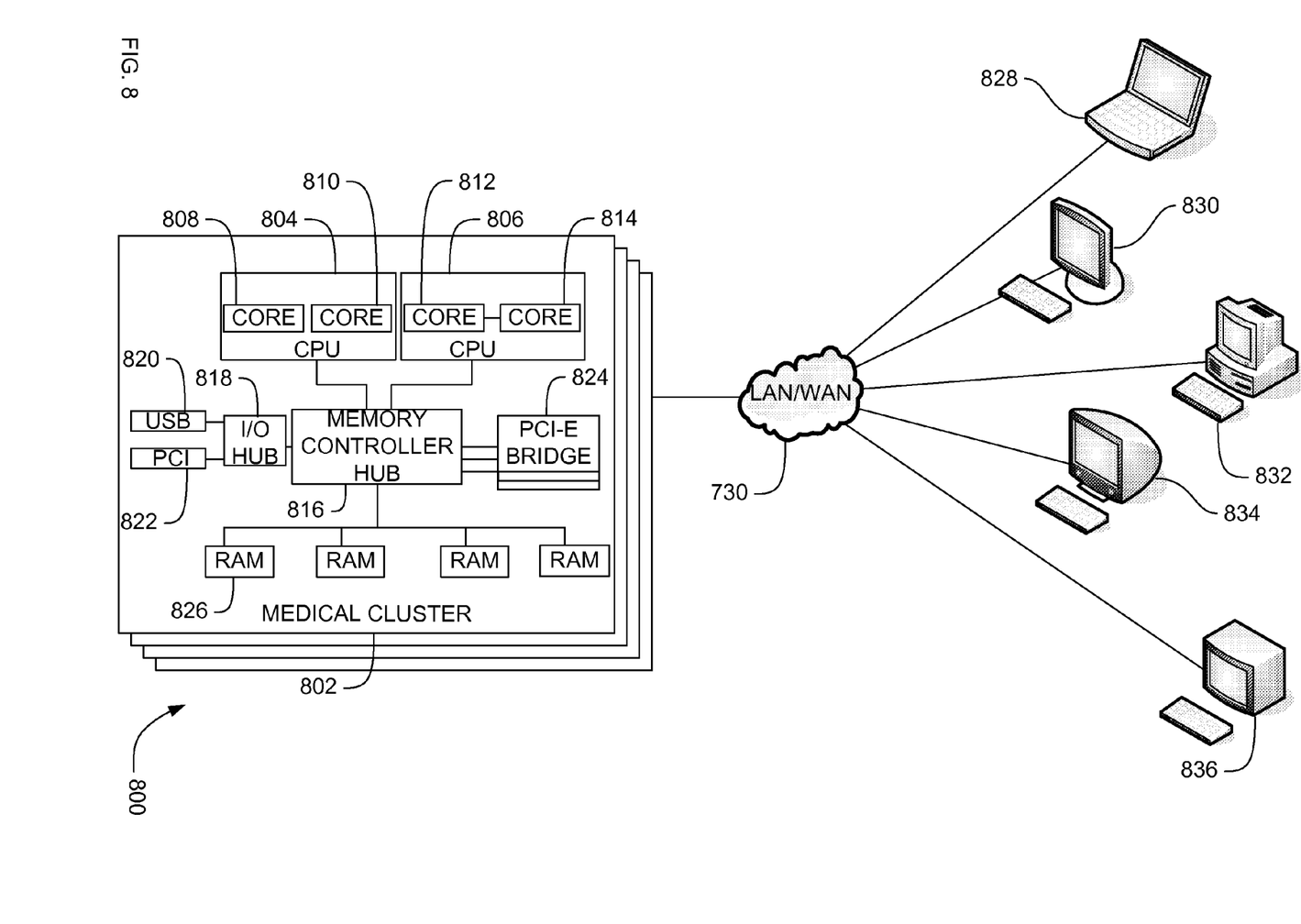
FIG. 8 is a block diagram of a hardware and operating environment in which different embodiments can be practiced.

FIG. 8 is a block diagram of a hardware and operating environment 800 in which different embodiments can be practiced. The hardware and operating environment 800 solves the need in the art to balance the load of users and applications across computer nodes in a healthcare environment.

The hardware and operating environment 800 includes at least one medical cluster 802. The medical cluster 802 is one example or embodiment of the healthcare-related computing resources 108 of FIG. 1. Some embodiments of the medical cluster 802 include two or more CPUs (e.g. 804 and 806), each CPU including at least one core processor (e.g. 808, 810, 812 and 814). In some embodiments of the medical cluster 802, the CPU(s) are operably coupled to a memory controller hub 816, which is in turn operably coupled to an input/output (I/O) hub 818, which is in turn operably coupled to a universal serial bus (USB) interface 820 and a peripheral component interconnect (PCI) interface 822. In some embodiments of the medical cluster 802, the memory controller hub 816 is operably coupled to a PCI-E bridge 824 and at least one random access memory (RAM) component 826.

In some embodiments of the hardware and operating environment 800, the medical cluster 802 is operably coupled to at least one client computer (e.g. 828, 830, 832, 834 and 836) through a LAN/WAN 730. The load of applications of the clients are balanced across the medical cluster 802 which provides a more balanced distribution of users running applications on the medical cluster 802, which in turn provides better overall performance for users of the clients. Thus, the hardware and operating environment 800 solves the need in the art need to balance the load of users and processes across computer nodes in a healthcare environment.

Implementations

Figure 9:
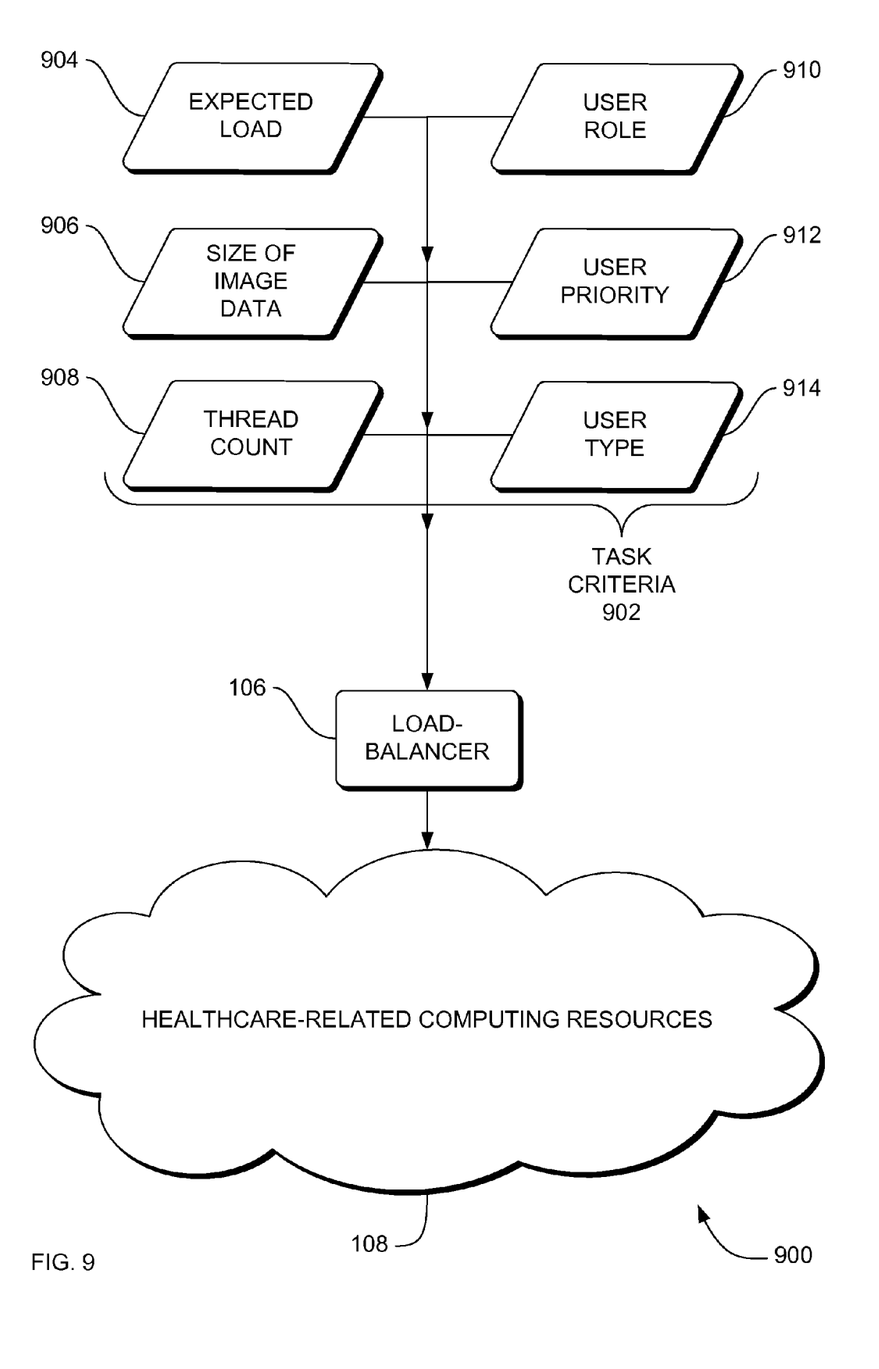
FIG. 9 is a block diagram of an apparatus that is operable to manage healthcare-related computing resources using application criteria, according to an embodiment.
Figure 10:
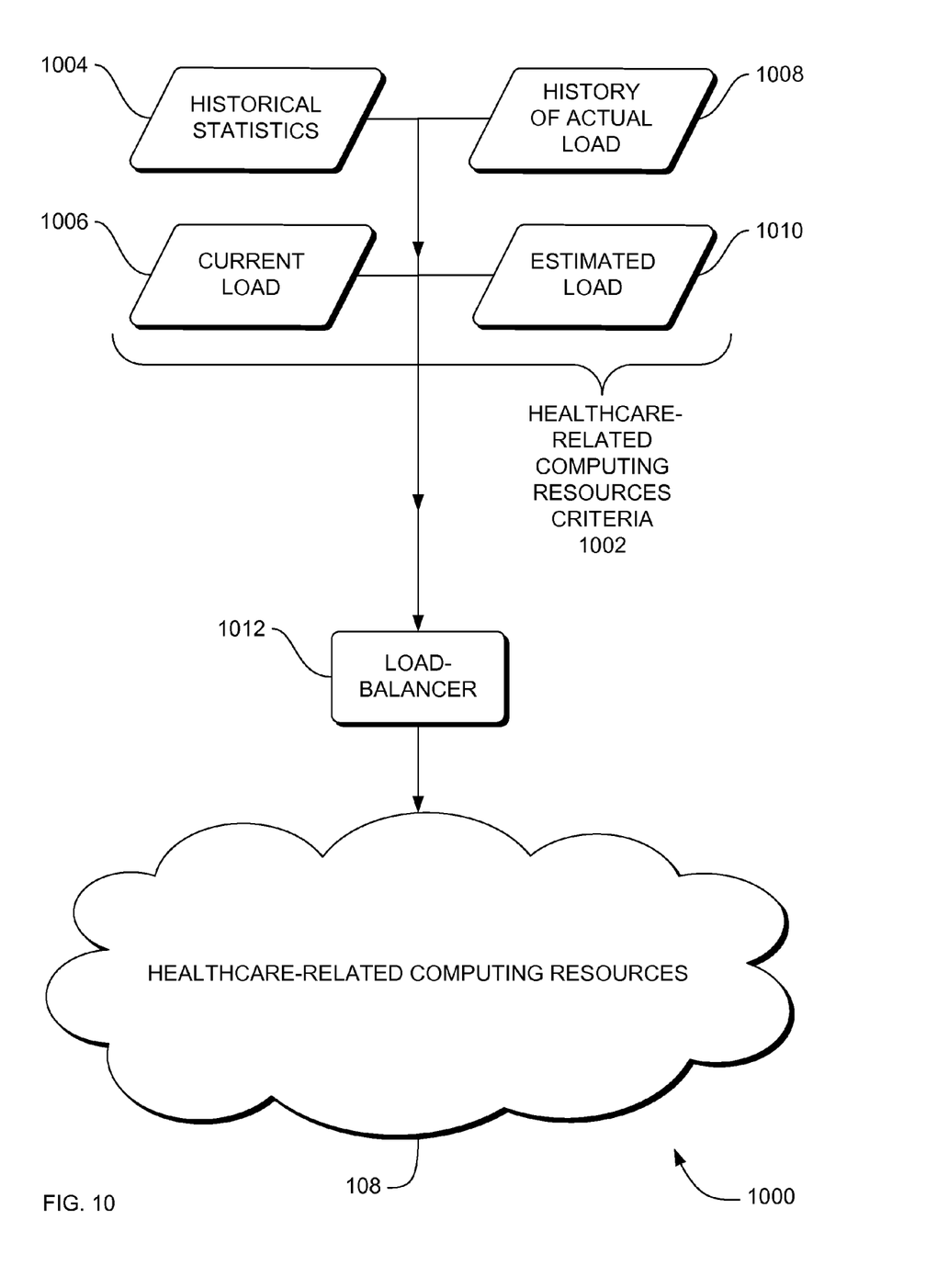
FIG. 10 is a block diagram of an apparatus that is operable to manage healthcare-related computing resources, according to an embodiment.

Referring to FIGS. 9-10, particular implementations are described in conjunction with the system overview in FIG. 1 and the methods described in conjunction with FIGS. 2-6.

FIG. 9 is a block diagram of an apparatus 900 that is operable to manage healthcare-related computing resources using application criteria, according to an embodiment. Apparatus 900 solves the need in the art to balance the load of users and processes across computer nodes in a healthcare computing environment.

Apparatus 900 receives load-balancing criteria 104 that includes application criteria 902. The application criteria 902 is one example or embodiment of the load-balancing criteria 104 in FIG. 1. The application criteria 902 describes or represents attributes of an application that requires healthcare-related computing resources 108 to process the application.

In some embodiments, the application criteria 902 includes at least one of an expectation 904 of a load that each of a plurality of applications will impose on the healthcare-related computing resources that is based on a type of application associated with each application, a size 906 of image data that is associated with each application, a thread count 908 that is associated with each application, a user-role 910 that is associated with each application, a user-priority 912 that is associated with each application, a user-type 914 that associated with each application. Including the user priority in the load-balance determination improves the possibility that users specified as higher priority get better or more consistent performance than those specified as lower priority.

Some embodiments of the user-type 914 include a power user, an intermediate user and a basic user. Some embodiments of the user-type 914 include a radiation technologist, a radiologist and an emergency-room physician. Those gradations of user-type 914 are helpful because those types of users are general indications of the amount of healthcare-related computing resources 108 that an application could be expected to require.

FIG. 10 is a block diagram of an apparatus 1000 that is operable to manage healthcare-related computing resources, according to an embodiment. Apparatus 1000 solves the need in the art to balance the load of users and processes across computer nodes in a healthcare computing environment.

Apparatus 1000 includes a receiver 102 that receives load-balancing criteria 104 that includes healthcare-related computing resources criteria 1002. The healthcare-related computing resources criteria 1002 is one example or embodiment of the load-balancing criteria 104 in FIG. 1. The healthcare-related computing resources criteria 1002 describes or represents attributes and capabilities of a healthcare-related computing resource that is operable to process an application.

In some embodiments, the healthcare-related computing resources criteria 1002 includes historical statistics 1004 that describe at least one load that the user-type has placed on the healthcare-related computing resources, a snapshot of a current load 1006 on each healthcare-related computing resources, a history of actual load 1008 on each computer node over a past time period, and an original estimated load 1010 of each user currently on each healthcare-related computing resource, when each user was originally assigned to that healthcare-related computing resource.

A load-balancer 1012 analyzes the historical statistics 1004, the snapshot of a current load 1006, the history of actual load 1008, and/or the original estimated load 1010 to determine the estimated load that is expected to be placed on healthcare-related computing resources 108, both in terms of CPU usage and memory load. The load-balancer 1012 will submit the application for execution on a portion of the healthcare-related computing resources 108 that can at the current time most readily process/execute that application.

Apparatus components of FIG. 9-10 can be embodied as computer hardware circuitry or as a computer-readable program, or a combination of both. In other embodiments, the load-balancers are implemented in an application service provider (ASP) system.

More specifically, in the computer-readable program embodiment, the programs can be structured in an object-orientation using an object-oriented language such as Java, Smalltalk or C++, and the programs can be structured in a procedural-orientation using a procedural language such as C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in server 702 in FIG. 7, or on at least as many computers as there are components.

Conclusion

A load-balancer of healthcare image applications and users across computing nodes is described. A technical effect of the healthcare image processing load balancer is to manage the allocation of computing resources among healthcare imaging applications in accordance with a set of criteria. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application is meant to include all object-oriented, database, healthcare imaging and communication environments and alternate technologies which provide the same functionality as described herein.

We claim:

1. A non-transitory computer-accessible medium having executable instructions to manage healthcare-related computing resources, the executable instructions capable of directing a processor to perform:
   receiving load-balancing criteria that indicates a projected load for each of a plurality of dynamic client-server healthcare applications based on at least a user-type associated with the healthcare applications, wherein at least one of the plurality of dynamic client-server healthcare applications performs at least one of contouring anatomical regions from a medical image or creating a plurality of graphical objects of related anatomical regions; and
   load-balancing the plurality of dynamic client-server healthcare applications across a plurality of healthcare-related computing resources in reference to the load-balancing criteria such that at least one healthcare application having a heavy projected load is processed by one of the healthcare related computing resources having a current load that is lower than current loads of the other healthcare related computing resources, wherein the load-balancing criteria further indicates historical statistics describing at least one load that the user-type has placed on the healthcare-related computing resources, wherein the healthcare-related computing resources further comprise at least one of a separate motherboard, daughterboard, CPU cores, or GPUs in a computer system, or a separate computer node in a cluster of computers.

2. The non-transitory computer-accessible medium of claim 1, wherein the load-balancing criteria further comprise:
   a representation of application criteria that describes attributes of the healthcare application; and
   a representation of healthcare-related computing resources criteria that describes attributes of the healthcare-related computing resources.

3. The non-transitory computer-accessible medium of claim 2, wherein receiving a representation of application criteria further comprises:
   receiving a representation of application criteria after receiving a representation of healthcare-related computing resources criteria.

4. The non-transitory computer-accessible medium of claim 2, wherein the application criteria further comprises:
   the projected load that each of the healthcare applications will impose on the healthcare-related computing resources, the projected load further based on at least one of:
   a type of application associated with the healthcare applications;
   a size of image data associated with the healthcare applications;
   a thread count associated with the healthcare applications;
   a user-role associated with the healthcare applications; or
   a user-priority associated with the healthcare applications.

5. The non-transitory computer-accessible medium of claim 4, wherein the user-type provides an estimation of the computing resources to be utilized by a user to perform the healthcare application, said user-types further comprise:
   a power user utilizing a first quantity of computing resources;
   an intermediate user utilizing a second quantity of computer resources that is less than the first quantity; and
   a basic user utilizing a third quantity of computer resources that is less than the first and second quantities.

6. The non-transitory computer-accessible medium of claim 4, wherein the user-type further comprises:
   a user-type of a radiation technologist, a radiologist or an emergency-room physician.

7. The non-transitory computer-accessible medium of claim 2, wherein the healthcare-related computing resources criteria further comprises at least one of:
   a snapshot of current load on each healthcare-related computing resource;
   a history of actual load on each computer node over a past time period; and
   an original estimated load of each user currently on each healthcare-related computing resource, when each user was originally assigned to that healthcare-related computing resource.

8. The non-transitory computer-accessible medium of claim 2, wherein the executable instructions capable of directing the processor to perform the load balancing further comprise executable instructions capable of directing the processor to perform:
   load-balancing of the healthcare-related computing resources in reference to the application criteria and the healthcare-related computing resources criteria.

9. The non-transitory computer-accessible medium of claim 1, wherein the executable instructions further comprise executable instructions capable of directing the processor to perform
   receiving a weighting of each of the load-balancing criteria, and the executable instructions capable of directing the processor to perform:
   load-balancing of the healthcare-related computing resources in reference to the load-balancing-criteria and the weighting.

10. The non-transitory computer-accessible medium of claim 2, wherein the healthcare-related computing resources further comprise:
    a node in a computer network.

11. The non-transitory computer-accessible medium of claim 10, wherein the load-balancing further comprises:
    load-balancing of healthcare image applications and users across computing nodes.

12. A non-transitory computer-accessible medium having executable instructions to manage healthcare-related computing resources, the executable instructions capable of directing a processor to perform:
    receiving a representation of real-time usage data associated with each of dynamic client-server healthcare applications across healthcare-related computing resources, wherein at least one of the plurality of dynamic client-server healthcare applications performs at least one of contouring anatomical regions from a medical image or creating a plurality of graphical objects of related anatomical regions;
    calculating an indication of an expectation of a load of a user, based at least on a user-type, that will be imposed on the healthcare-related computing resources, wherein the expectation of the load further comprises historical statistics describing a load the user of the user-type has placed on the healthcare-related computing resources; and
    load-balancing of the healthcare-related computing resources in reference to the real-time usage data associated with each of the healthcare-related computing resources and the expectation of the load of the user such that a healthcare application having a heavy projected load is processed by a client server-application healthcare related computing resource having a current load that is lower than current loads of the other healthcare related computing resources.

13. The non-transitory computer-accessible medium of claim 12, wherein the user-type further comprises:
a user-type of a radiation technologist, an emergency-room physician or a radiologist.

14. The non-transitory computer-accessible medium of claim 12, wherein the user-type further comprises:
a high-priority user-type.

15. The non-transitory computer-accessible medium of claim 12, wherein the executable instructions is capable of directing the processor to perform the load balancing in reference to the following additional criteria:
a) the expectation of the load of the user further based on at least one of:
    i) a type of application associated with the healthcare applications;
    ii) a size of image data associated with the healthcare applications;
    iii) a thread count associated with the healthcare applications;
    iv) a user-role associated with the healthcare applications; or
    v) a user-priority associated with the healthcare applications;
b) a snapshot of current load on each healthcare-related computing resources;
c) a history of actual load on each healthcare-related computing resource over a past time period; and
d) an original estimated load of each user currently on each healthcare-related computing resource when each user was originally assigned to that healthcare-related computing resource.

16. A method for load balancing a plurality of healthcare imaging workstations connected to a network, said method comprising:

selecting a healthcare image application to process image data, wherein the healthcare image application performs at least one of contouring anatomical regions from a medical image or creating a plurality of graphical objects of related anatomical regions;
determining a projected load of the selected healthcare image application based at least on a user-type associated with the selected healthcare image application; and
assigning the selected healthcare image application to a first medical imaging workstation out of a plurality of medical imaging workstations based on the projected load, wherein the first medical imaging workstation is chosen based on load balancing such that the first medical imaging workstation has a current load that is low relative to current loads of the other medical imaging workstations, wherein the selected healthcare image application is assigned to the first medical imaging workstation further based on historical statistics describing at least one load that the user-type has placed on the healthcare imaging workstations.

17. The method of claim 16 further comprising:
determining if a second healthcare imaging workstation is operating; and
assigning the selected healthcare image application to the first healthcare imaging workstation, if the second healthcare imaging workstation is not working.

18. The method of claim 16 wherein determining a projected load of the healthcare application further comprises:
utilizing a first quantity of computing resources when a user operating the healthcare imaging application is a power user;
utilizing a second quantity of resources when a user operating the healthcare imaging application is an intermediate user; and
utilizing a third quantity of resources when a user operating the healthcare imaging application is a basic user.

* * * * *